June 15, 1954  W. P. HALVORSEN  2,681,194
SELF-CENTERING DEVICE FOR HANGING PICTURES AND THE LIKE
Filed Jan. 20, 1950
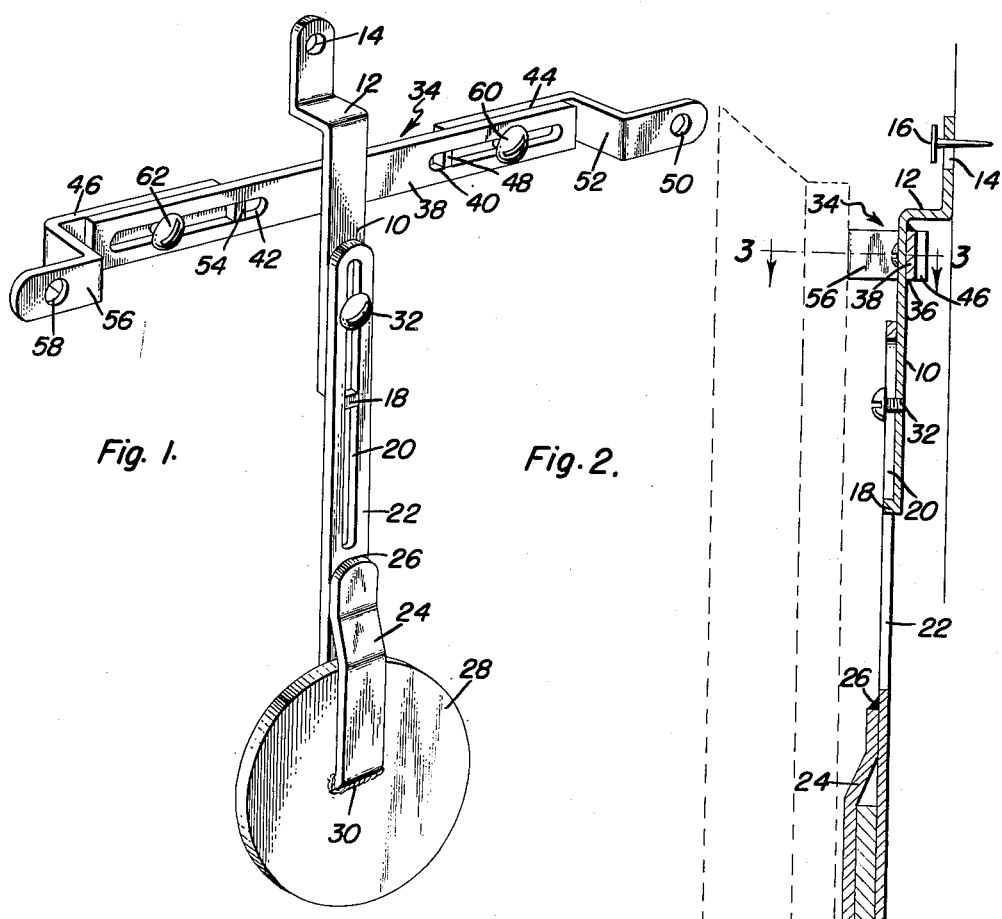
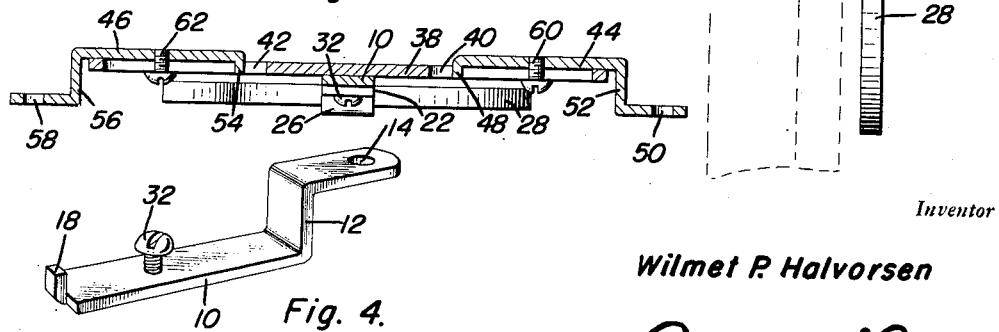
Inventor
Wilmet P. Halvorsen
By *Clarence A. O'Brien and Harvey B. Jacobson*
Attorneys Patented June 15, 1954

2,681,194

UNITED STATES PATENT OFFICE 2,681,194

SELF-CENTERING DEVICE FOR HANGING PICTURES AND THE LIKE

Wilmet P. Halvorsen, Red Wing, Minn.

Application January 20, 1950, Serial No. 139,745

1 Claim. (Cl. 248—29)

This invention relates to improvements in hangers for pictures, mirrors, and like objects.

An object of this invention is to support a picture or similar object on a wall, door or other element by a device which has a weight at the bottom thereof, the device being arranged so that the weight acted upon by the pull of gravity tends to retain the picture in the proper position.

Another object of this invention is to adjustably connect various elements of the device so that it will accommodate pictures of various sizes.

A further object of this invention is to space the top part of the picture, mirror or other object from the wall by offsetting a part of a transverse bracket, the bracket being used for fixing the picture in place.

Other objects and features will become apparent in following description of the illustrated form of the invention.

In the drawings:

Figure 1 is a perspective view of the device;

Figure 2 is a longitudinal sectional view of the device shown in Figure 1 and indicating the approximate position of a picture or mirror as it would be hung thereon and thereby;

Figure 3 is a sectional view taken substantially on the line 3—3 of Figure 2 and in the direction of the arrows; and Figure 4 is a perspective view of one of the straps which is employed as an operative part of the device.

The disclosed embodiment of the invention comprises a pendulum which consists of a first strap 10 which has an offset 12 formed intermediate the ends thereof and an opening 14 at one end. This opening is adapted to accommodate a nail 16 or other fastening device, as a screw. The screw or nail is for the purpose of penetration into a wall so as to support the strap 10 for pendulous movement. The offset is formed by having two 90 degree bends adjacent each other in the material of the strap.

The lower end of the strap has a keeper or guide 18 fixed to or integral therewith. This keeper is disposed in a slot 20 which is formed longitudinally in a second strap 22. This second strap has a hook 24 formed at its lower end. The portion of the strap forming the hook is welded as at 26 to an intermediate part of the strap and there is a weighted member, as the disk 28, carried by the hook. If found desirable, the weighted member 28 may be welded or soldered as at 30 to the bight of the hook.

A fastening device, as the screw 32, is passed through the slot 20 and is disposed in a threaded opening (unnumbered) in the first strap 10. By tightening the screw, the head thereof clamps firmly against the material of the second strap adjacent the slot thereby frictionally binding it against said first strap 10.

A substantially U-shaped bracket generally indicated at 34 is disposed transversely of the first strap 10 and held firmly in place adjacent the offset 12 by means of soldering or brazing or welding as at 36.

The bracket is symmetrical. There is a flat plate 38 which is fixed to the first strap 10 by the weld 36. A slot 40 is provided longitudinally in the flat plate 38 at one end and there is a slot 42 in this flat plate at the other end. Members 44 and 46, respectively, forming a means for actually accommodating the picture by its frame, are disposed on the ends of the flat plate 38. The member 44 has a keeper 48 at one end and an opening 50 at the opposite end adapted to accommodate screws or nails. There is an offset 52 intermediate the ends of the member 44 in order to hold the picture in spaced relationship with respect to the first strap 10 and hence with respect to the wall, provided in the member 44. The keeper 48 is operable in the slot 40 and limits the travel of the member 44 with respect to the plate 38. The keeper 18 operable in the slot 20 serves an identical function with respect to the first and second straps.

A keeper 54 which is disposed at one end of the member 46 is operable in the slot 42 and serves the purpose of limiting the member with respect to the plate 38. Said member 42 has an offset 56 therein serving the same purpose as the offset 52. There is an opening 58 adjacent the offset 56 and in the member 46 so that a screw or nail passed therethrough may penetrate a picture frame to hold the picture frame fixed on the holding bracket or mounting bracket 34.

A screw 60 which is threadedly secured to the member 44 is passed through the slot 40 so that the head thereof clamps against the material of the plate 38 adjacent the slot to releasably hold the member 44 in adjusted positions. A screw 62 serving an identical function is operatively connected with the member 46 and the slot 42.

It will be noted that any element adaptable for use in connection with this device may be hung thereby. Moreover, the first strap 10 is interchangeable with respect to the members 44 and 46.

In operation a nail or screw is passed through the opening 14 in the first strap 10. This nail or screw is also anchored in a wall or other suitable place. It is recommended that the nail 16 be driven only partially in so that the entire device is capable of pendulous movement.

After the members 44 and 46 have been adjusted properly so that the holes 50 and 58 are arranged to receive screws and/or nails properly, the picture is secured thereto as disclosed in Figure 2. This operation, of course, precedes the hanging of the first strap by the nail 16.

In accordance with the size of the picture, the weight 28 is adjusted upwardly or downwardly in order to supply a longer or shorter movement arm through which the weight 28 is operable.

After the device is placed on a wall, inasmuch as due to the offset 12, the weight 28 has no contact with the wall, the device will be swung by the operation of gravity to such position that the longitudinal axes of the two straps is substantially vertical. This will cause the picture or other hung device to assume the proper position on a wall.

Having described the invention, what is claimed as new is:

A picture hanger including, a pendulum having an aperture in its upper end portion for pivotally mounting said pendulum on a wall, said pendulum comprising a weight on its lower end, and a substantially U-shaped bracket, for attachment to a picture, fixed transversely on the upper portion of the pendulum at a point in spaced relation below the aperture, said pendulum further comprising a forward offset between the aperture and the bracket for spacing said bracket from the wall.

References Cited in the file of this patent
UNITED STATES PATENTS

| Number | Name | Date |
|---|---|---|
| 396,280 | Jaeger | Jan. 15, 1889 |
| 521,291 | Lynch | June 12, 1894 |
| 1,050,235 | Scanlan | Jan. 14, 1913 |
| 1,107,686 | Mehrmann | Aug. 18, 1914 |
| 1,209,582 | Hoernegel | Dec. 19, 1916 |
| 2,066,641 | Melior et al. | Jan. 5, 1937 |
| 2,166,523 | Gaebel | July 18, 1939 |